United States Patent [19]

Desyllas et al.

[11] 4,086,629
[45] Apr. 25, 1978

[54] HIERARCHICAL DATA STORE WITH LOOK-AHEAD ACTION

[75] Inventors: Peter Leo Lawrence Desyllas, Wilmslow Park; John Austin Jones, Stockport; Brian John Procter, Hyde, all of England

[73] Assignee: International Computers Limited, London, England

[21] Appl. No.: 700,720

[22] Filed: Jun. 28, 1976

[30] Foreign Application Priority Data

Jul. 9, 1975 United Kingdom ............... 28800/75

[51] Int. Cl.² ............................................. G06F 13/00
[52] U.S. Cl. ............................................................ 364/200
[58] Field of Search ............... 340/172.5; 364/200 MS

[56] References Cited
U.S. PATENT DOCUMENTS

| | | | |
|---|---|---|---|
| 3,292,153 | 12/1966 | Barton et al. | 340/172.5 |
| 3,928,857 | 12/1975 | Carter et al. | 340/172.5 |
| 3,936,804 | 2/1976 | Bachman | 340/172.5 |
| 3,949,379 | 4/1976 | Ball | 340/172.5 |

Primary Examiner—Raulfe B. Zache
Attorney, Agent, or Firm—George R. Douglas, Jr.; Sherman Levy

[57] ABSTRACT

A hierarchical data storage system comprises a main store and a smaller, faster slave store containing data currently required for processing. The memory system responds to a store access command to retrieve an item of data. In addition, for certain types of store access command, the system performs a look-ahead action to ensure that the slave store is loaded with another data item which forms part of a possible sequence. In certain cases, a test is made to determine whether the possible sequence is in the ascending or descending direction, and the look-ahead access is then made in the appropriate direction.

5 Claims, 4 Drawing Figures

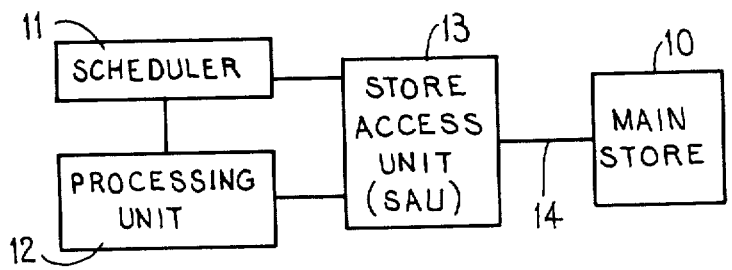
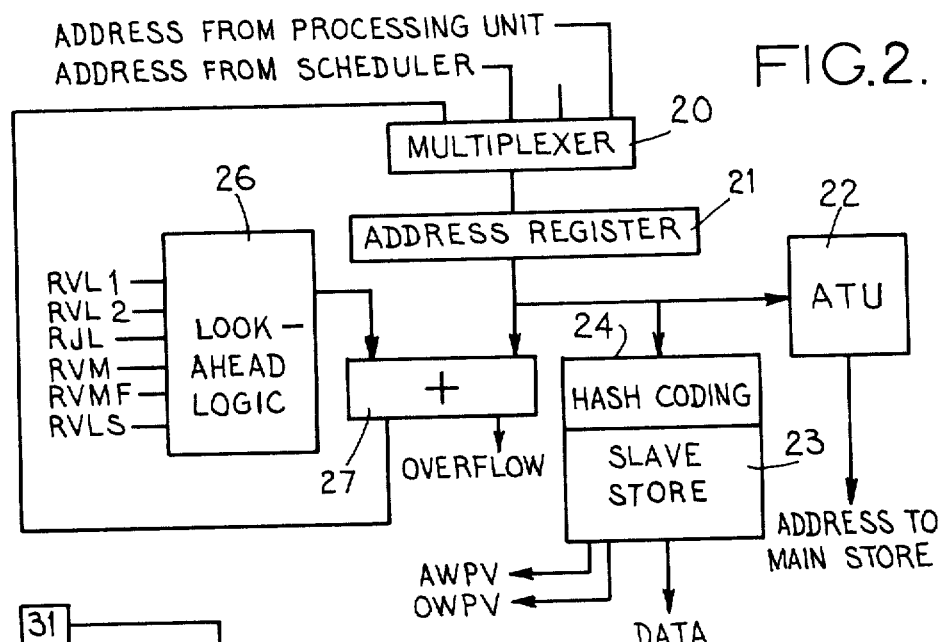
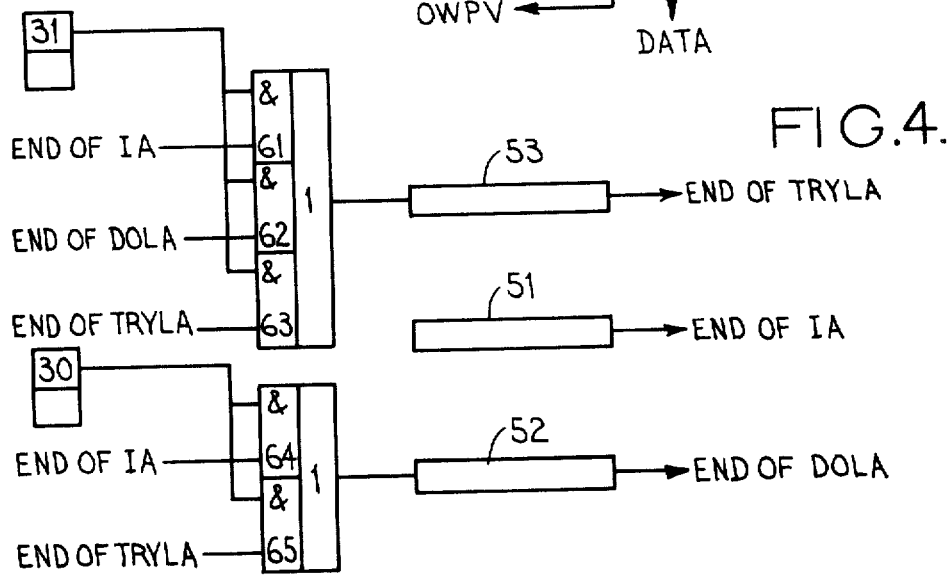

HIERARCHICAL DATA STORE WITH LOOK-AHEAD ACTION

This invention relates to data storage systems.

In general, for a given data storage technology, fast access speed and high storage capacity are conflicting requiremenets. That is to say, the larger a data store becomes, the greater the physical distances the signals have to travel and hence the slower the access speed. Moreover, high-speed storage devices are generally more expensive than slow-speed devices, and therefore it is often uneconomic to implement a large data storage system using only high-speed devices.

One way of overcoming this problem is by use of a hierarchical storage system. Such systems are, for example, reviewed in an article by C. J. Conti in Computer Group News, March 1969, page 9 entitled "Concepts for Buffer Storage".

Basically, a hierarchical storage system comprises a large, relatively slow main store, and a smaller but faster slave store (sometimes referred to as a buffer store, or a cache store). Whenever store access is called for, it is attempted in the first instance in the slave store, and only if this is unsuccessful (i.e. if the accessed data item is not present in the slave store) is the access made from the main store. In this way, the effective average access time for the system will, in general, be less than that of the main store and, ideally, may approach that of the slave store.

Clearly, the efficiency of such a system depends on the algorithm used for updating the slave store. An efficient algorithm will ensure that the slave store is only loaded with data which has a high probability of being accessed in the near future.

In general the basic principle of slave store updating algorithms is that data items accessed from the main store are written into the slave store, since recently accessed items will generally have a high probability of being required again. Moreover, data may be arranged in the main store in blocks, and whenever data in a particular block is accessed the whole of that block may be loaded into the slave store, since there is a high probability that other data in that block will also be required shortly.

It has also been proposed to prefetch data blocks in advance of their requirement, as follows: if data is currently being accessed from block N, there is a high probability that block N+1 will be required in the near future. Therefore, block N+1 is prefetched from the main store and placed in the slave store. However this technique is rather inefficient, since it tends to result in a large number of unnecessary prefetches.

One object of the present invention is to provide a storage system in which data is prefetched but in which the number of unnecessary prefetches may be reduced.

According to a first aspect of the invention, a data storage system includes a main store, a slave store of smaller size but faster access time than the main store, data items in the slave store being accessible in response to a set of store access commands, and look-ahead logic for loading data items from the main store into the slave store in anticipation of their requirement, wherein the look-ahead logic is operable only in respect of a subset of the store access commands.

It can be seen that the system has two classes of store access command, of which one invokes a look-ahead action and the other does not. Commands of the former class are intended to be used only in situations where it is likely that the currently accessed data item forms part of a sequence, (e.g. for accessing instructions, which are usually stored sequentially). Thus, the system provides the programmer with the facility for specifying whether or not look-ahead action is required, and this is of great assistance in reducing the number of unnecessary look-ahead accesses.

Preferably, the prefetched data item is ensured to be present in the slave store by first testing whether it is already present in the slave store and, if it is not, fetching it from the main store and writing it into the slave store. This avoids waste of time in fetching data items which are already present in the slave store.

Another object of the present invention is to provide a system which can prefetch data items forming part of a sequence where it is not known a priori which direction the sequence is likely to be in (i.e. whether it is a sequence on ascending or decending addresses).

According to a second aspect of the invention, a data storage system includes a main store, a slave store of smaller size but faster access time than the main store, and look-ahead logic for loading data items from the main store into the slave store in anticipation of their requirement, wherein the look-ahead logic is operative to ascertain the direction of a possible sequence of data items including an item which is being accessed from the stores, and to cause look-ahead action to take place in that direction so as to ensure that a subsequent data item of that possible sequence is loaded into the slave store.

The direction of the possible sequence of data items may be ascertained by testing whether an item or group of items having an address displaced in a first direction from that of the currently accessed item is present in the slave store, if it is not present the sequence being presumed to be in that first direction while, if it is present the sequence being presumed to be in the opposite direction.

The data items are preferably arranged in the main store in groups (e.g. pairs of words) and whenever the look-ahead logic ensures that a data item is present in the slave store it also ensures that the or each other item in the same group is present in the slave store.

One data processing system including a data storage system in accordance with the invention will now be described by way of example with reference to the accompanying drawings of which:

FIG. 1 is an overall view of the data processing system;

FIG. 2 shows a store access unit forming part of the system;

FIG. 4 shows a sequence control circuit.

GENERAL DESCRIPTION OF SYSTEM

Figure 3:
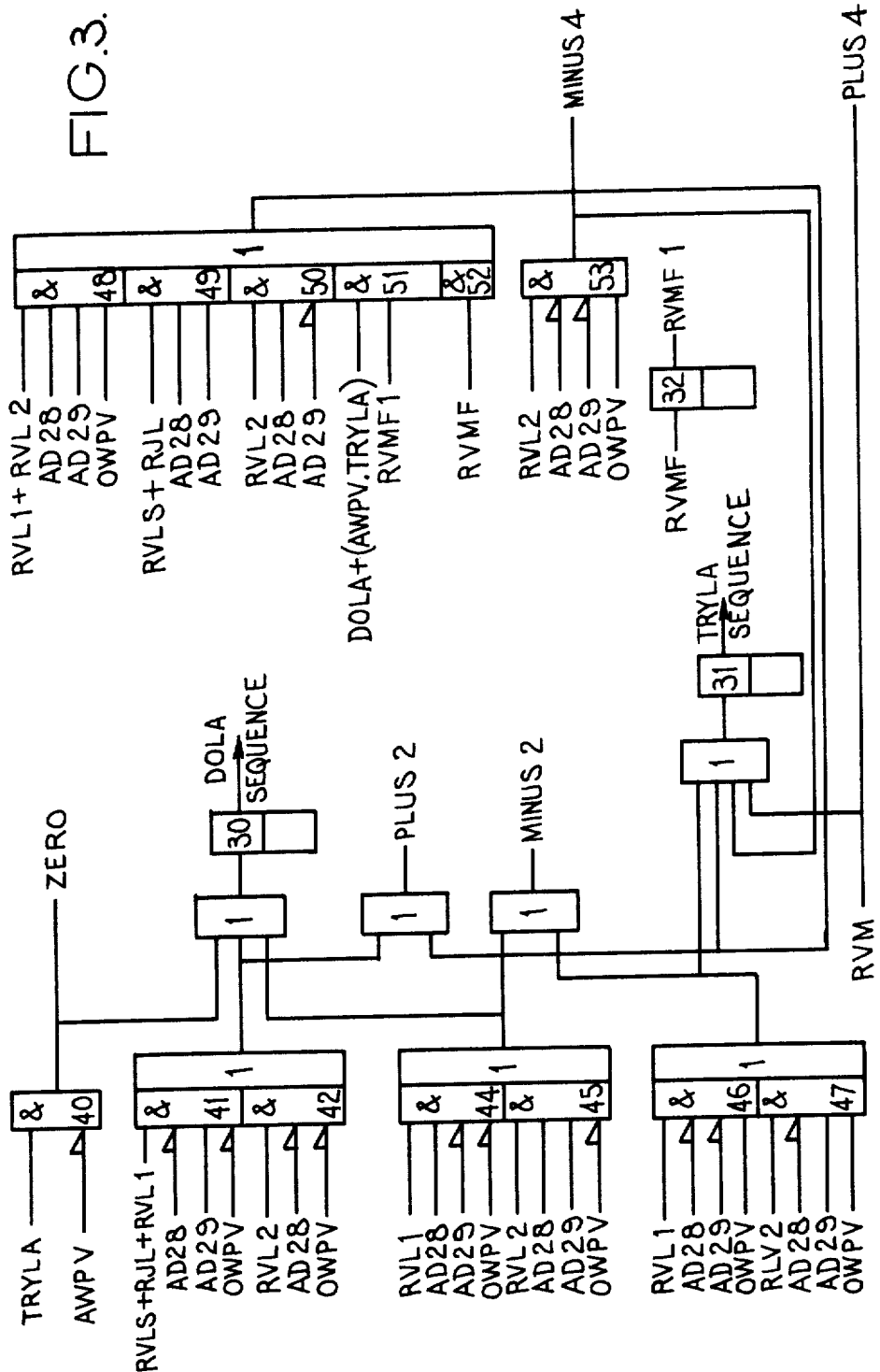
FIG. 3 shows a look-ahead logic circuit.

Referring to FIG. 1, the data processing system comprises a main store 10, a microprogrammed processing unit 12, a scheduler unit 11, and a store access unit (SAU) 13.

The main store 10 holds various types of data, including instructions for execution by the system, operands and descriptors. Typically, the store has a capacity of the order of 256 K words and an access time of around 840 nanoseconds. The store access path 14 is two words wide, which means that each access returns a pair of words from the store.

The SAU acts as an intermediary between the processing unit 12 and the scheduler 11 on the one hand and the main store 10 on the other, by receiving store access commands from the processing unit and the scheduler and servicing them in the appropriate manner, making read or write access to the main store as necessary. These commands may include real or virtual addresses, and the SAU contains an address translation unit for converting virtual addresses into real addresses where necessary.

The SAU also contains a data slave store. This is a small, fast memory arranged to hold virtually addressed data which is likely to be required for access in the near future.

The basic principle of operation of the slave store is that any data item written to the main store by a virtually addressed command is written also to the slave store, and similarly any item read by a virtually addressed command from the main store is copied into the slave store. This principle may be modified for certain commands, but the general effect is that recently accessed items are available in the slave store. Thus, in the event of a subsequent read command they can be accessed automatically from the slave store without the delay incurred by a main store access.

Certain virtually addressed, read commands indicate to the SAU that the current access is likely to be one of a sequence on contiguous addresses. The SAU handles these commands by first accessing the addressed word in the normal way from the slave store (if it is present there) or the main store, and then going on to ensure that the slave store is loaded with the next pair or words in the possible sequence (referred to as the look-ahead word pair). For this purpose, a test is made to determine whether the look-ahead word pair is already present in the slave store and, if it is not, that word pair is fetched from the main store and loaded into the slave store. This is referred to as a look-ahead action. In the case of some commands, the look-ahead action includes a decision as to the likely direction of the sequence.

The basic function of the scheduler is to prefetch instructions for execution by the processing unit in anticipation of their requirement, by issuing read commands to the SAU. The scheduler also decodes each instruction, while the previous one is being executed and then, on request, passes to the processing unit a set of parameters which define the tasks which have to be performed by the processing unit in order to complete the execution of the instruction. An instruction is normally executed in two tasks (exceptionally one or three) and the parameters passed to the processing unit for each task normally include a microprogram start address, a task length indicator, a copy of the instruction, and other flag setting and loop count information.

Jump instructions are evaluated by the microprogram in the processing unit in the same way as other instructions, but if a change of sequence is indicated, the microprogram initiates fetching of the jump destination instruction, before completing excecution of the current instruction. Any previously prefetched instructions in the scheduler are discarded.

The processing unit is a general purpose, microprogrammed unit, including a 256-word working store having a 125 nanosecond cycle time, a 32-word pushdown stack having a 62.5 nanosecond cycle time, and a microprogram store holding 8–16K words. Microprogram instructions are normally executed at the rate of one every 125 nanoseconds, but the timer may be held up to allow synchronisation of other units (in particular, to wait for data from the SAU).

STORE ACCESS UNIT (SAU)

Referring now to FIG. 2, the SAU receives, with each store access command from the scheduler or the processing unit, a 30-bit address, by way of a multiplexer 20. The first 28 bits (0–27) of this address may be considered as the address of a particular four-word section of the store, while bit 28 selects a word pair in this section and bit 29 specifies one word of the selected pair.

This address is staticised in an address register 21, the bits of which are denoted by AD0 to AD29 in order of decreasing significance.

The contents of the address register are applied to an address translation unit (ATU) 22, which converts virtual addresses into corresponding real addresses for applying to the main store. For this purpose, the ATU contains a number of current page registers which hold the base real addresses of pages which are currently being utilised by the system, a page being defined as a 256-word portion of the virtual store. Thus, to convert a virtual address to a real address, the appropriate current page register is first selected and then the base address contained in that register is added to a displacement portion of the virtual address. If the required base address is not, in fact, present in any of the current page registers, an interrupt signal is sent to the processing unit, and will initiate a microprogram sequence for updating the current page registers.

FIG. 2 also shows the data slave store 23 of the SAU. The slave store is a random access memory having an access time of 45 nanoseconds, and holding a total of 256 words divided into 64 four-word cells. At any one time, each active cell is dedicated to a particular four-word section of the virtual store and any, all, or none of its words may contain valid data. Each word in the slave store therefore has a validity bit associated with it to indicate whether it contains valid data. Each active cell also contains the virtual address of the four-word section of the virtual store it is associated with.

Whenever the SAU recieves a virtually addressed command, a five-bit hash address is formed in a hash-coding circuit 24, from selected bits of the virtual address in the address register 21, as follows:

| Hash Bit | Derivation |
|---|---|
| 0 | AD0 |
| 1 | (AD24) ≡ (AD12) |
| 2 | (AD25) ≡ (Ad13) |
| 3 | AD26 |
| 4 | AD27 | where the symbol ≡ represents the equivalence of the two bits.

This hash address is applied to the address input of the slave store, so as to select a pair of cells. A comparison is then made between the virtual address stored in each of these cells and the contents of the address register. If correspondence is found for either of these cells, a check is made to see if the addressed word in that cell is valid. If it is, the required update or read access is made to that word. If it is not valid, any necessary main store access is made to correct the situation.

If, on the other hand neither cell of the pair corresponds to the contents of the address register, the cell which has been used less recently of that pair is selected and reassigned to the new virtual address. This cell is then updated, as required, by accessing the main store.

It should be noted that, since the access path to the main store is two words wide, whenever a word is accessed from the main store the other word of the pair will also be returend to the SAU and written into the slave store.

However, only the addressed word of the pair will be returned to the processing unit or the scheduler.

Each cell in the slave store also contains flags, which indicate whether the data in that cell is available for reading, writing or instruction execution, or a combination of these. These flags are set to the appropriate states when the cell is assigned, and are used for access permission checks when that cell is accessed.

The slave store also produces two output signals AWPV and OWPV, for use in the look-ahead action as will be described later. AWPV (Addressed word pair valid) is "true" if both words of the addressed word pair (that is to say, the word pair containing the addressed word) are valid, while OWPV (other word pair valid) is true if both words of the other pair in the same cell are valid.

SAU FUNCTIONS

The SAU is able to execute a variety of functions in response to store access commands from the scheduler or the processing unit.

Each of these functions commences with a sequence of operations referred to as the initial access sequence, in which the word specified by the address register 21 is accessed for reading or updating as required, and is returned to the scheduler and/or the processing unit as the case may be. This sequence may in some cases be followed by one or more further sequences for performing look-ahead action.

In the case of a command from the processing unit, the particular function which is to be performed is specified by a five-bit function code in the command. Some of these functions may involve a look-ahead action while others do not.

Two examples of functions which do not involve any look-ahead action are as follows:

RV Read Virtual. This is the basic function for reading a word from virtual store. The word is read from the slave store or main store, as described above. A read access permission check is made and, if successful, the word is passed to the processing unit.

RJ Read Jump Destination. This function is used to initiate a change of instruction sequence. The function causes a word to be read from virtual store as in RV. An execute access permission check is made and, if successful, the word is passed both to the processing unit and the scheduler as the jump destination instruction. The virtual address of the word is also passed to the scheduler as the jump address.

A complete list of non-look-ahead functions is not given here since it is not essential to an understanding of the invention. Briefly, however, other such functions include write functions as well as read functions, and some of these involve real addressing instead of virtual addressing.

The following are the functions which can be generated by the processing unit and which can result in a look-ahead action.

RVL1 Read virtual with look-ahead (one word). This function is intended for reading one of a sequence of single word items which are likely to be at contiguous addresses, but where it is not known whether they are in ascending or descending order. This is similar to the RV function, but may involve a look-ahead action which will be described later.

RVL2 Read virtual with look-ahead (two word). This function is intended for reading the higher-addressed-word of one of a sequence of double word items which are likely to be at consecutive addresses (in ascending or descending order). This is similar to RVL1 but with a different look-ahead action.

RVM Read Virtual Multiword. This function is intended for use where a sequence of read accesses are made on an ascending series of contiguous addresses. Basically, it is similar to RV, but including a look ahead.

RVMF Read Virtual Multiword, first. This function is used to prime the data slave store in preparation for a sequence of RVM functions. Basically it is the same as RVM except that it involves double look-ahead action.

RJL Read Jump Destination with look-ahead. This is basically the same as RJ, but may involve a look-ahead.

In the case of a store access command from the scheduler to the SAU, the following function is executed:

RVLS Read Virtual with look-ahead; Scheduler. This function is used by the scheduler to prefetch instructions for execution. It cannot be generated by the processing unit. A word is read from virtual store as in RV, but in this case an execute access permission check is made. If the check is successful, the word is returned to the scheduler. This may be followed by look-ahead action.

Look-ahead action may therefore be invoked by six different functions, five of which come from the processing unit, and one from the scheduler.

In all cases, look-ahead action involves a test to determine whether the look-ahead pair (i.e. the next possible word pair in the sequence) is present in the slave store. If it is not present, that word pair is fetched from the main store and placed in the slave store. In the case of RVMF, the next again possible word pair is also tested and fetched if necessary.

Functions RVM and RVMF, as mentioned above, are used for reading sequences of data on ascending addresses, while functions RJL and RVLS are used for reading instructions which are assumed to be stored in ascending order. Therefore, look-ahead action for these four functions will always be in the forward direction.

Functions RVL1 and RVL2 on the other hand are intended for reading sequences where it is not known whether the addresses are ascending or descending. The look-ahead action for these functions therefore also involves a decision to determine the likely direction of the sequence. The first look-ahead action of a sequence may, in this case, be in the wrong direction, and thus wasted, but subsequent accesses should have correct look-ahead action.

Once look-ahead action has been decided on, it is given a higher priority than any new function request.

LOOK-AHEAD LOGIC

Referring still to FIG. 2, the SAU includes a look-ahead logic circuit 26 which controls the look-ahead action. This circuit controls operation of an adding circuit 27, which can increment the eight least significant bits AD22-29 of the address register by 0, +2, −2, +4 or −4, so as to generate the address of the look-ahead word pair. The incremented address can be written into the address register by way of the multiplexer 20. If an overflow occurs from this addition, indicating that the boundary of a 256-word page has been crossed, the look-ahead action is abandoned. Thus, look-ahead cannot take place across the boundaries of pages.

Referring now to FIG. 3, the look-ahead logic circuit includes three latches (bistable circuits) 30–32 and a set of AND-gates 40–53.

The logic circuit receives input signals RVL1, RVL2, RVM, RVMF, RJL and RVLS during the initial access sequences of these functions, and can produce one of five increment signals ZERO, PLUS 2, MINUS 2, PLUS 4 and MINUS 4. These increment signals are applied to the adding circuit 27 (FIG. 2) so as to increment the address in the address register by the corresponding amount.

At the end of each initial access sequence, the states of the latches 30, 31 are tested. If latch 30 is set, a further sequence, referred to as the DOLA (do look ahead) sequence is entered, while if latch 31 is set, a sequence referred to as the TRYLA (try look ahead) sequence is entered. At the end of each TRYLA sequence, the latches 30, 31 are again tested, and if latch 30 is set, a DOLA sequence is initiated, while if latch 31 is set another TRYLA sequence is initiated. At the end of each DOLA sequence, the latch 31 is tested and if set a TRYLA sequence is initiated.

The latch 30 is clocked during each initial access sequence and TRYLA sequence. The latch 31 is normally clocked only during the initial access sequence, but in the case of a RVMF function, will also be clocked during the DOLA and TRYLA sequences. Latch 32 is clocked during TRYLA sequences only.

The operation of the look-ahead logic is basically as follows. During the initial access sequence, if the logic ascertains that the look-ahead word pair is in the same four-word section of the store as the currently addressed word, the corresponding word pair in the slave store is tested for validity.

If that word pair is not valid (i.e. either or both of the words are not valid), a signal is applied to latch 30, causing that latch to be set when it is clocked. A DOLA sequence will therefore follow.

In the DOLA sequence, the incremented address from the adding circuit 27 (representing the address of the look-ahead word pair) is clocked into the address register 21, and a main store access is then made to fetch the look-ahead word pair and place it in the slave store.

Alternatively, during the initial access sequence, if the logic ascertains that the look-ahead word pair is in a different four-word section of the store from the currently addressed word, a signal is applied to latch 31, causing it to be set when clocked. A TRYLA sequence will therefore follow.

In the TRYLA sequence, the address of the look-ahead word pair is clocked into the address register, so as to address the corresponding cell of the slave store. At the same time, a signal is applied to one input of the AND gate 40. If the addressed word pair in the slave store is not valid (i.e. AWPV = 0), this gate will be enabled, generating a ZERO increment signal and applying an input to latch 30, causing it to be set when it is clocked. A DOLA sequence will therefore follow, to fetch the look-ahead word pair as described above.

Thus, it can be seen that the look-ahead logic always tests whether the look-ahead word pair is present in the slave store, and if it is not present, initiates a DOLA sequence to fetch it from the main store. If the look-ahead word pair is in the same four-word section as the initially addressed word, the test can be made immediately, since the appropriate cell of the slave store is already being accessed. If, on the other hand, the look-ahead word pair is in a different four-word section, the test cannot be made immediately, and so a TRYLA sequence is initiated, in which the appropriate cell of the slave store is accessed. The only exception to this is the RVMF function, as will be described later.

The operation of the look-ahead logic will now be described in detail for each look-ahead function in turn, referring still to FIG. 3. For convenience, the four words in the cell which is addressed during the initial access sequence will be referred to as words 0 to 3, while the words in the cells assigned to the two contiguous sections of the virtual store are referred to as words −4 to −1 and 4 to 7 respectively.

RJL

No look ahead is necessary for this function if the addressed word is 0 or 2, since the next word in the (assumed ascending) sequence should already be present in the slave store.

If word 1 is addressed (i.e. AD28=0, AD29=1) and if word pair 2, 3 is not valid (i.e. OWPV=0), and AND-gate 41 is enabled. This generates a PLUS 2 signal and also sets the latch 30. A DOLA sequence is thus initiated, in which the address register is incremented by +2 to point to word 3. The word pair 2, 3 will thus be fetched from main store.

If word 3 is addressed, AND-gate 49 is enabled, generating PLUS 2 and setting the latch 31. A TRYLA sequence is thus initiated, in which the address register is incremented by +2 to point to word 5 (i.e. the second word in the next cell). If word pair 4,5 is not valid, AND-gate 40 will be enabled and the latch 30 will be set. Thus, a DOLA sequence will be initiated so as to fetch this word pair from main store.

This is conveniently summarised by the following table:

| AD 28,29 | OWPV | Gate | Increment | Sequence |
|---|---|---|---|---|
| 0 | — | — | — | — |
| 1 | 0 | 41 | +2 | DOLA |
| 2 | — | — | — | — |
| 3 | — | 49 | +2 | TRYLA |

RVL1

As mentioned above, the function is used where it is not known whether the sequence of addresses is ascending or descending. A test is therefore included in this function, to determine the likely direction of the sequence on the basis of the available evidence. For example, if word 0 is addressed, and word pair 2,3 is valid, it is assumed that the sequence is descending, while if word pair 2,3 is invalid, the sequence is assumed to be ascending.

The look-ahead action of this function is summarised in the following table:

| AD 28,29 | OWPV | Gate | Increment | Sequence |
|---|---|---|---|---|
| 0 | 1 | 46 | −2 | TRYLA |
| 1 | 0 | 41 | +2 | DOLA |
| 2 | 0 | 44 | −2 | DOLA |
| 3 | 1 | 48 | +2 | TRYLA |

RVL2

Again, this function includes a test as to the likely direction of the sequence. The test takes into account the fact that the initially addressed word is assumed to be the higher-addressed word of a double word item.

The following table shows the look-ahead action of this function:

| AD 28,29 | OWPV | Gate | Increment | Sequence |
|---|---|---|---|---|
| 0 | 0 | 42 | +2 | DOLA |
| 0 | 1 | 53 | −4 | TRYLA |
| 1 | 0 | 42 | +2 | DOLA |
| 1 | 1 | 47 | −2 | TRYLA |
| 2 | — | 50 | +2 | TRYLA |
| 3 | 0 | 45 | −2 | DOLA |
| 3 | 1 | 48 | +2 | TRYLA |

RVLS

Since this function only deals with ascending sequences, no look-ahead is necessary when word 0 or 2 is addressed.

The look-ahead action is as follows:

| AD 28,29 | OWPV | Gate | Increment | Sequence |
|---|---|---|---|---|
| 0 | — | — | — | — |
| 1 | 0 | 41 | +2 | DOLA |
| 2 | — | — | — | — |
| 3 | — | 49 | +2 | TRYLA |

RVM

This function always initiates a TRYLA sequence with the address incremented by +4.

RVMF

This function enables AND-gate 52, resulting in a TRYLA sequence with the address incremented by +2. During the TRYLA sequence, latch 32 is clocked and therefore set, so that RVMF1 is now "true".

During the TRYLA sequence, if the addressed word pair (i.e. the word pair at the incremented address) is not valid, AND-gate 40 is enabled, initiating a DOLA sequence to fetch this word pair. During the DOLA sequence, AND-gate 51 is enabled, and this results in a second TRYLA sequence with the address further incremented by +2. Alternatively, if the addressed word pair is valid during the first TRYLA sequence, the AND-gate 51 will be enabled then, and the second TRYLA sequence will commence immediately without any intervening DOLA sequence.

During the second TRYLA sequence, if the addressed word pair (i.e. the word pair at the twice-incremented address) is not valid, the AND-gate 40 is enabled, initiating a DOLA sequence to fetch this word pair.

The latch 32 is clocked again during this second TRYLA sequence and since RVMF will by now have reverted to "false", the latch 32 will be reset.

In summary, it will be seen that the RVMF function ensures that two look-ahead word pairs are present in the slave store. For example, if the initial access is at word 2, the look-ahead action will check whether word pairs 4,5 and 6,7 are also present and, if either is not present, will fetch that pair from main store.

SEQUENCE CONTROL LOGIC

Referring now to FIG. 4, this shows the sequence control logic for controlling the various sequences performed by the SAU.

Three shift registers 51–53 are provided, for controlling the initial access sequence, the DOLA sequence and the TRYLA sequences respectively. Whenever one of these sequences is required, a binary "1" is injected into the left-hand end of the appropriate register, and this "1" is then clocked along to the right-hand end of the register, producing a series of control signals for the SAU. When the "1" reaches the right hand end of the register, it initiates a test to determine which sequence is to be entered next, as follows.

At the end of an initial access sequence, if latch 30 is set, AND-gate 64 is enabled, causing a "1" to be injected into the left-hand end of the DOLA register 52, and thus initiating a DOLA sequence. If, on the other hand, the latch 31 is set, AND-gate 61 is enabled, causing a "1" to be injected into the TRYLA register 53 and thus initiating a TRYLA sequence.

At the end of a DOLA sequence, if latch 31 is set, AND-gate 63 is enabled, and so a TRYLA sequence is initiated.

At the end of a TRYLA sequence, if latch 30 is set, AND-gate 65 is enabled, thus initiating a DOLA sequence, while if latch 31 is set, AND-gate 62 is enabled and TRYLA sequence is therefore initiated.

When all the sequences have terminated, a new function can be initiated by injecting a "1" into the left-hand end of register 51, thus starting a new initial access sequence.

We claim:

1. A data storage system comprising a main store, a slave store of smaller size but faster access time than the main store, means responsive to a set of store access commands for accessing data items from the slave store, each said store access command having a store access address associated with it, and look-ahead logic comprising:
   a. means responsive to one of a sub-set of said store access commands to generate an increment signal,
   b. means for adding said increment signal to said store access address to produce a look-ahead address, and
   c. means for applying the look-ahead address to the main store to access a data item from the main store for writing into the slave store.

2. A data storage system comprising a main store, a slave store of smaller size but faster access time than the main store, an address register, and means for applying the contents of the address register to the slave store in response to a store access command, to access a data item from the slave store, wherein the invention consists of look-ahead logic comprising:
   a. means responsive to a store access command for determining the direction of a possible sequence of data items including the item currently being accessed, to produce a positive or negative increment signal representing said direction;
   b. means for adding said increment signal to the contents of said address register, to produce a look-ahead address specifying a subsequent data item in said possible sequence; and
   c. means for applying said look-ahead address to the main store to access said subsequent data item from the main store and for writing that data item into the slave store.

3. A system according to claim 2 wherein said means for determining the direction of a possible sequence comprises means for testing whether an item having an address displaced in a predetermined direction from the address currently in the address register is present in the slave store, and for generating said positive or negative increment signal in accordance with the result of that test.

4. A system according to claim 2 wherein the main store is divided into sections each containing four data items and the slave store is divided into cells each of which contains four data items (0,) (1,) (2,) (3) and which is mapped on to one section of the main store, and wherein said means for determining the direction of a possible sequence of data items comprises:
   i. means responsive to a store access command addressing item (0) in one of said cells, for testing whether items (2) and (3) in that cell are valid and, if so, generating a negative increment signal;
   ii. means responsive to a store access command addressing item (1) in a cell, for testing whether items (2) and (3) in that cell are invalid and, if so, generating a positive increment signal;
   iii. means responsive to a store access command addressing item (2) in a cell, for testing whether items (0) and (1) in that cell are invalid and, if so, generating a negative increment signal; and
   iv. means responsive to a store access command addressing item (3) in a cell, for testing whether items (0) and (1) in that cell are valid and, if so, generating a positive increment signal.

5. A data storage system comprising:
   a. a main store;
   b. a slave store of smaller size but faster access time than the main store;
   c. an address register;
   d. means responsive to a store access command of a first type, for utilising the contents of the address register to access a data item from the slave store, without any look-ahead action;
   e. means responsive to a store access command of a second type, for utilising the contents of the address register to access a data item from the slave store and then incrementing the contents of the address register by a positive amount to produce a look-ahead address and utilising said look-ahead data item from the main store for writing into the slave store; and
   f. means responsive to a store access command of a third type, for utilising the contents of the address register to access a data item from the slave store and then determining the direction of a possible sequence of data items including said item accessed from the slave store, incrementing the contents of the address register by a positive or negative amount according to said direction to produce a look-ahead address, and utilising said look-ahead address to access a look-ahead data item from the main store for writing into the slave store.

* * * * *